2 Sheets--Sheet 1.
T. L. PHIPPS.
Animal-Clippers.
No. 166,631.
Patented Aug. 10, 1875.
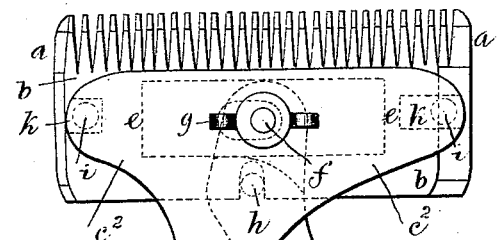
Fig. 1.
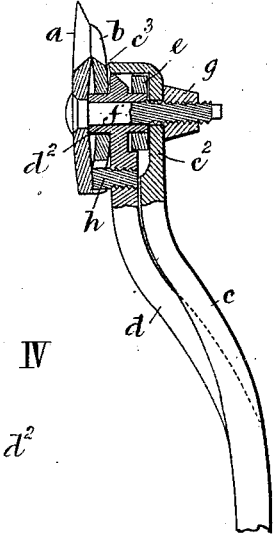
Fig. II.
Fig. IV.
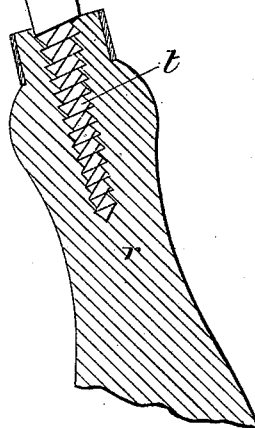
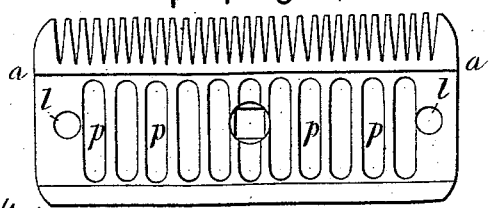
Fig. V.
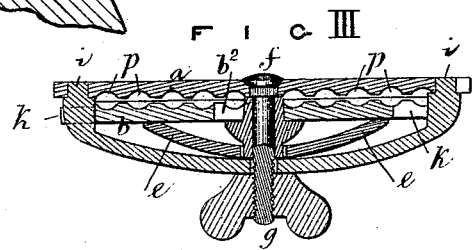
Fig. III.
Witnesses,
Richard Skerrett
Henry Skerrett
Inventor
Thomas Lovell Phipps

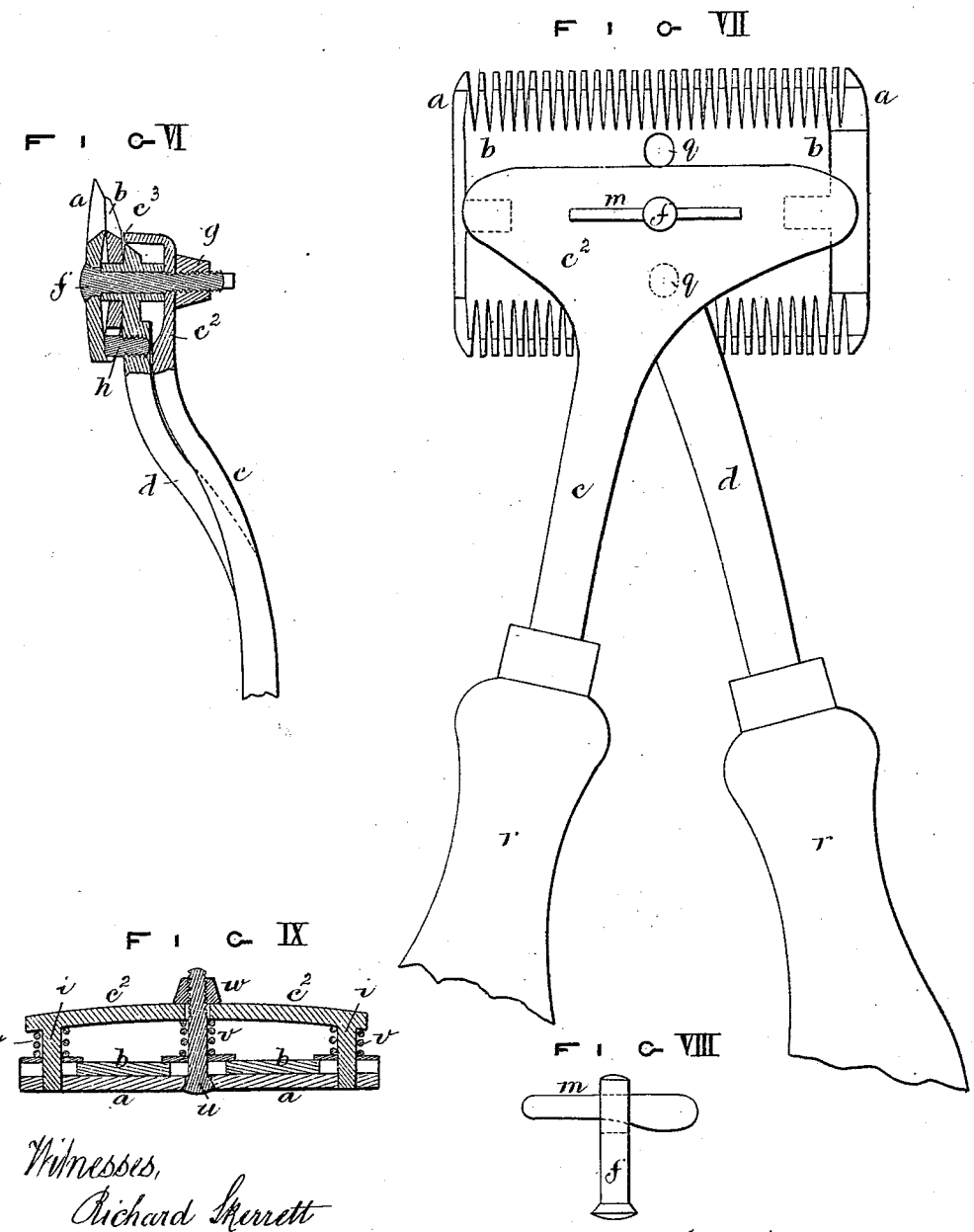

UNITED STATES PATENT OFFICE.

THOMAS L. PHIPPS, OF BIRMINGHAM, ENGLAND.

IMPROVEMENT IN ANIMAL-CLIPPERS.

Specification forming part of Letters Patent No. 166,631, dated August 10, 1875; application filed July 6, 1875.

*To all whom it may concern:*

Be it known that I, THOMAS LOVELL PHIPPS, of Birmingham, in the county of Warwick, England, mechanical engineer, have invented Improvements in Clippers for clipping horses and other animals, and for other like purposes, of which the following is a specification:

My invention consists of the construction and combinations or arrangements, hereinafter described, of the parts of clippers for clipping horses and other animals, and for other like purposes.

The cutters consist of two plates, having either serrated edges at front, as usual, or serrated edges both at front and back. In the latter case the clipper has a double-cutting action. By means of a bow-spring or coiled springs between the case or cover of the clipper and the movable cutter, the said movable cutter is pressed into contact with the fixed cutter with any required degree of pressure. The movable cutter being thus kept to its bearing on the fixed cutter by a spring or springs, its action is more certain and uniform than when it is adjusted by screws or other fixed bearings. The movable cutter is worked by a handle or lever turning on a central pin or axis, a stud on the said handle or lever taking into a slot in the said movable cutter. The clipper is held while being worked by a fixed handle. On the motion of the movable handle or lever a reciprocating motion is given to the movable cutter, and the clipping is effected by the serrated edges of the two cutters in the ordinary way.

The cutters, handles, and bow-spring are connected together by the central pin passing through the said parts in the following manner. The central pin is first passed through the fixed cutter, its head taking into a countersink on the under side of the fixed cutter. The movable cutter is next placed on the fixed cutter, the pin passing through its slot. The movable handle is next placed upon the said pin, which pin constitutes the center, on which the said handle turns, the pin or stud on the under side of the said handle engaging with a recess in the base of the movable cutter. The bow-spring is then placed on the said pin, and finally the fixed handle. The head of the fixed handle is expanded laterally on each side its center, so as to form a case or cover, and each of the expanded parts or ends of the case or cover carries on its under side a stud, which studs pass through guiding-slots in the movable cutter, and engage in holes in the fixed cutter. By means of a nut screwed on the central pin or axis, or a cotter passed through a cotter-hole in the said pin, the whole of the parts are fixed together.

The spring described may be omitted, and the upper edge of the case or cover of the fixed handle be used as a fixed bearing-plate for bearing directly on the movable cutter.

In order to lubricate the moving parts, transverse corrugations are made on the inner opposed faces of the cutters. In these corrugations wool or other porous material charged with oil or other lubricant is placed, and during the working of the clipper the lubricant is pressed out of the wool and is distributed over the moving parts. I fix the wooden part of the handle to the metallic part by a screw on the end of the latter screwing into a hole in the former.

Having explained the nature of my invention, I will proceed to describe, with reference to the accompanying drawings, the manner in which the same is to be performed.

Figure 1 represents in plan, Fig. 2 in cross-section, and Fig. 3 in longitudinal section, a clipper constructed according to my invention. Fig. 4 is a side elevation of a portion of the movable handle or lever of the clipper, and Fig. 5 is a plan of the fixed cutter of the clipper. Figs. 6, 7, 8, and 9 represent modifications of the same.

$a$ is the fixed cutter, and $b$ is the movable cutter. $c$ is the fixed handle, by which the clipper is held, and $d$ is the movable handle or lever by which the movable cutter $b$ is worked. The head $c^2$ of the fixed handle $c$ has the form represented, and serves as a case or cover to the clipper. Between the case or cover $c^2$ and the movable cutter $b$ is a bow-spring, $e$, for holding the said movable cutter in contact with the fixed cutter $a$ with the required pressure. The cutters $a$ $b$, handles $c$ $d$, cover $c^2$, and bow-spring $e$, are connected together by the central screw-pin $f$, upon which a screw-nut, $g$, is screwed, as represented. In putting the parts of the clipper together the central screw-pin $f$ is first passed through the fixed cutter $a$, its head taking into a countersink in the under side of the fixed cutter. The movable cutter $b$ is next placed on the fixed cutter, the central pin $f$ passing through the slot $b^2$ in the cutter $b$. The movable handle or lever $d$ is next placed upon the central pin $f$, the long tubular bearing-piece $d^2$ on the said handle $d$ fitting closely upon the said pin, and a stud, $h$, screwed into the under side of the handle or lever $d$, taking into a hole in the edge of the movable cutter. The bow-spring $e$ is next placed on the pin $f$, and finally the fixed handle $c$ $c^2$. The ends of the expanded head or cover $c^2$ of the fixed handle $c$ have studs $i$ $i$ on their under side, which studs pass through the guide-slots $k$ $k$ in the movable cutter $b$ and engage in holes $l$ $l$ in the fixed cutter $a$. (See Figs. 1 and 5.) By now screwing home the screw-nut $g$ on the screwed head of the central pin $f$, the whole of the parts are bound together, and the clipper is ready for use.

Instead of fastening all the parts of the clipper together by a screw pin and nut, a wedge-shaped cotter and a plain pin may be employed, as represented in Figs. 7 and 8. In this arrangement the pin $f$ is without a screw at its head, and has a cotter-hole in it, through which the wedge-shaped cotter $m$ is passed. By driving the cotter $m$ to a greater or less distance in the cotter-hole in the pin $f$ a greater or less tension may be given to the bow-spring.

In Fig. 7 I have represented a clipper constructed according to my invention, having a double cutting action—that is to say, the front and back longitudinal edges of each cutter $a$ $b$ are provided with cutting-teeth, so that on the motion of the movable cutter $b$ a cutting action takes place at opposite edges of the clipper. This form of clipper is particularly useful for clipping the top of the head along the root of the mane, down the flanks, the chest, and between the fore legs, or any part where the hair grows the reverse way.

In order to enable the cutters $a$ $b$ of the double-action clipper, Fig. 7, to be reversed at pleasure—that is, to make either edge the front edge—a slot or recess, marked $q$, is made at each longitudinal edge of the movable cutter, so that when the front serrated edges of the cutters $a$ $b$ are worn, which takes place sooner than the back edges, the position of the two handles $c$ $d$ is changed, the stud on the movable handle $d$ now occupying the slot in that edge of the movable cutter which was previously the front edge.

The bow-spring $e$ may be dispensed with, and the fore part $c^3$ of the cover or case $c^2$ of the fixed handle may be made to take a direct bearing on the movable cutter $b$. The said cover or case $c^2$ is screwed up to the movable cutter to the required extent by driving home the screw-nut $g$.

A cross-section of a clipper without a bow-spring is represented in Fig. 6.

Fig. 9 represents a longitudinal section of a clipper in which the movable cutter $b$ is pressed to the fixed cutter $a$ by coiled springs, according to my invention. In this arrangement a central screw-pin, $u$, and the lengthened studs $i$ of the cover $c^2$ of the fixed handle $c$, pass through the fixed cutter $a$, and through slots in the movable cutter $b$. Around the pin $u$ and studs $i$ are coiled springs $v$, bearing, respectively, against the movable cutter $b$ and under side of the case or cover $c^2$. By means of a screw-nut, $w$, on the screwed end of the central pin $u$ the coiled springs $v$ may be compressed, and the movable cutter $b$ pressed with the required pressure upon the fixed cutter $a$.

In the opposed faces of the fixed and movable cutters $a$ $b$ transverse corrugations marked $p$ $p$, in Figs. 3 and 5, are made. These corrugations are filled with wool or other porous material charged with oil or other lubricant. When the clipper is worked the lubricant is pressed out of the wool, and is distributed over the moving parts.

The wooden or gripe parts $r$ $r$ of the handles of the several clippers are connected to the metallic parts or stems of the said handles in the manner represented in the section of one of the handles in Fig. 1—that is to say, I make on the end of the metallic part or stem of the handle a screw, $t$, which is screwed into a hole in the wooden handle or gripe $r$.

Clippers constructed according to my invention, besides being used for clipping horses and other animals, may be used, when made of a larger size, for clipping the grass of lawns, and for clipping and shearing generally.

Having now described the nature of my invention, and the manner in which the same is to be performed, I wish it to be understood that I do not limit myself to the precise details herein described and illustrated, as the same may be varied without departing from the nature of my invention; but

I claim as my invention of improvements in clippers for clipping horses and other animals, and for other like purposes—

1. In a clipping-machine, a fixed handle, having a head which serves as a case or cover to the clipper, and a fixed bearing-plate for the movable cutter, substantially as shown and set forth.

2. The combination of the fixed cutter, the movable cutter, the movable handle, the fixed handle provided with a head which serves as a case or cover to the clipper, and a bearing-plate for the movable cutter, and the spring or springs interposed between the movable cutter and the fixed head, and covered and protected by said heads, said parts being arranged and held together as shown and set forth.

3. The combination, with the handles, of the fixed and movable cutters provided with cutting-teeth on their front and back longitudinal edges, and constructed and arranged, substantially as described, so as to be reversible, in order to bring either set of cutting-teeth to the front of the clipper at pleasure.

THOMAS LOVELL PHIPPS. [L. S.]

Witnesses:
RICHARD SKERRETT,
HENRY SKERRETT,
*Of 37 Temple street, Birmingham.*